United States Patent [19]

Rathmell

[11] 4,201,094
[45] May 6, 1980

[54] AUTOMATIC SPEED SHIFT FOR BICYCLES AND THE LIKE

[76] Inventor: Richard K. Rathmell, 12 Pine Tree Rd., Ramsey, N.J. 07446

[21] Appl. No.: 855,172

[22] Filed: Nov. 28, 1977

[51] Int. Cl.² .............................................. F16H 11/00
[52] U.S. Cl. ........................... 74/217 B; 74/242.11 B; 280/236
[58] Field of Search .................. 74/217 B, 242.11 B; 280/261, 236, 237, 238

[56] References Cited

U.S. PATENT DOCUMENTS

| 3,613,466 | 10/1971 | Houghton | 74/217 B |
| 3,830,521 | 8/1974 | Gardel et al. | 280/236 |
| 3,926,020 | 12/1975 | Dantowitz et al. | 74/217 B |
| 4,061,046 | 12/1977 | Lang | 74/217 B |

FOREIGN PATENT DOCUMENTS

| 108024 | 12/1912 | Fed. Rep. of Germany | 280/236 |
| 952647 | 11/1949 | France | 74/217 B |
| 525149 | 8/1940 | United Kingdom | 280/236 |

*Primary Examiner*—Albert W. Davis
*Assistant Examiner*—Gerald Anderson

[57] ABSTRACT

Automatic gear shifters or speed changers for bicycles and the like have been described which are intended to be responsive to speed changes as sensed by centrifugal weights or force changes as sensed by chain tension. It is necessary to prevent excessive shifting due to cyclic pedal positions, vibrational conditions, or shock loads. The subject, a force responsive automatic shifter, employs a hydraulic damping system to limit the rate of shifting, and in a simplified arrangement, the force is sensed indirectly from that portion of the rider's weight which rests on the saddle seat.

9 Claims, 4 Drawing Figures

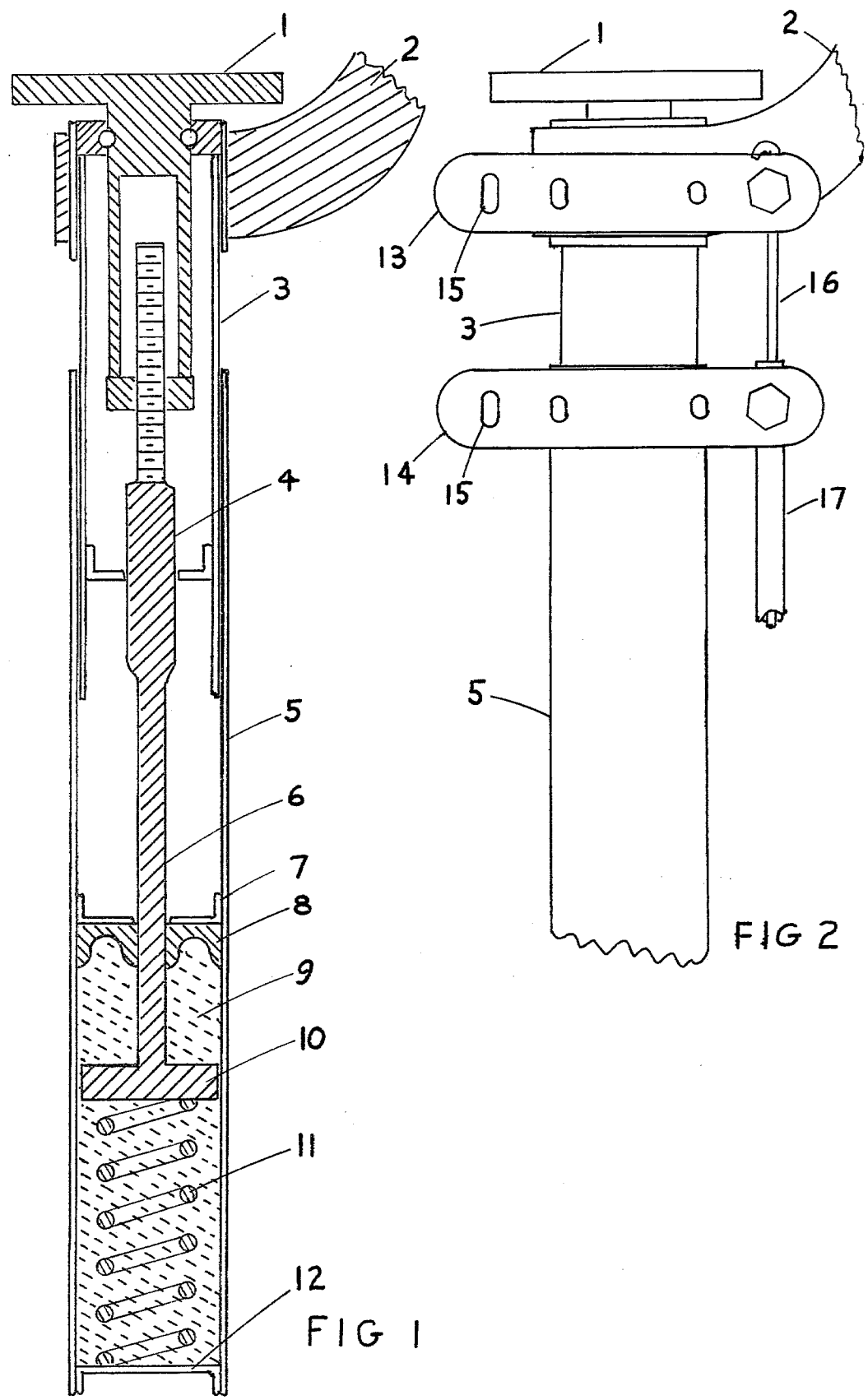

AUTOMATIC SPEED SHIFT FOR BICYCLES AND THE LIKE

BACKGROUND

Millions of bicycles and the like have been sold with variable speed transmissions that are manually shifted, but efforts to make an automatic shifting device have not been so successful on a commercial scale.

The reasons why a cyclist should want an automatic shifting device have been reviewed by R. E. Perry in U.S. Pat. No. 3,929,025.

Known designs for automatic shift controls are intended to be responsive either to speed changes or to force changes. U.S. Pat. Nos. 3,301,095 and 3,388,617 describe speed responsive devices with centrifugal weights. The U.S. Pat. No. 3,929,025 describes a force responsive device, working with chain tension variations, and having mechanical means to prevent excessively rapid shifting due to cyclic pedal positions or shock loads. U.S. Pat. No. 3,613,466 is related.

It is important to recognize that there are several kinds of variable speed transmission systems widely used for bicycles and similar pedal-powered vehicles. Such variable speed transmission systems may be called adjustable speed force transmission systems, and they commonly are found connected to the rear hub of a two wheel bicycle. The great majority of these are manually shifted by a mechanical linkage that delivers an important push or pull action to some shiftable element in the transmission system. We are concerned here with the system that initiates a shift and delivers the important push or pull action to the shiftable element. Accordingly, the automatic shift control can be applied to any pedal-powered vehicle having either a derailleur type transmission, a multiple speed hub, or some other type of shiftable transmission, including infinitely variable types.

OBJECT

It is the object of this invention to provide a simplified automatic shift control for a bicycle or a similar pedal-powered vehicle, with means to shift to a lower speed for more strenuous conditions, as up a grade, or to shift to a higher speed for easier pedaling conditions, and the means to prevent excessive shifting due to cyclic pedal positions, vibrational loads, or shock loads.

It is a further object to provide adjustment means so the rider can choose a setting for generally faster riding with more effort, generally slower riding with less effort, or intermediate settings.

It is a further object to provide an automatic shift control device that can be added to an existing bicycle having a variable speed transmission, or be part of a new bicycle, without requiring modifications to the frame.

BRIEF DESCRIPTION OF DRAWINGS

FIG. 1 is a sectional view of the force sensing mechanism of FIG. 3.

FIG. 2 is a view of the force sensing mechanism of FIG. 4.

DESCRIPTION OF INVENTION

Figure 3:
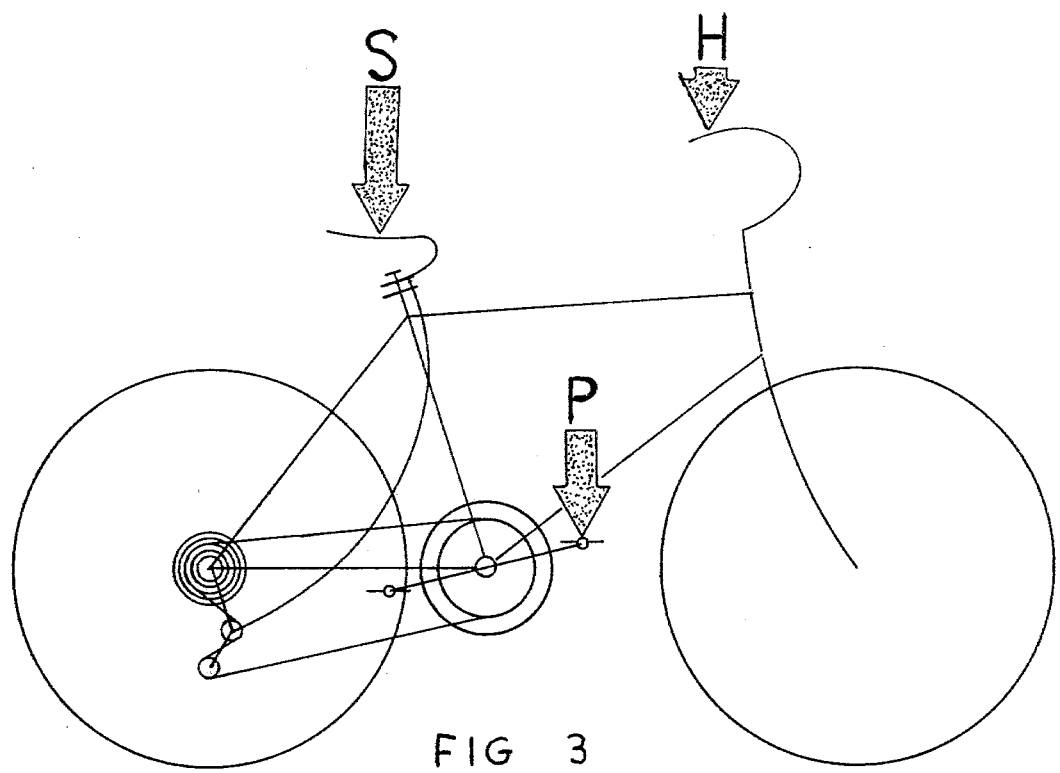
FIG. 3 illustrates a force sensing mechanism responsive saddle pressure.

The subject automatic force-responsive shift control system is applicable for bicycles and those vehicles having at least:
 a. One power-driven wheel.
 b. Pedals to receive an input force provided by the rider.
 c. An adjustable speed force transmission system to transmit force from the pedals to a wheel, wherein the transmission speed represents the ratio of wheel speed to pedal speed, and the speed ratio can be shifted by a push or pull action on some element of the transmission system. (A shift in speed ratio may be called "shifting gears".)

One part associated with the subject invention is a force sensing element having means to produce a signal in response to a force change. To avoid confusion, this signal herein is called a motion signal. Any elastic device, such as a spring, can be used to sense a change in force, and the relative motion between two points is the motion signal produced.

Another part associated with the subject invention is a motion linkage system, with means to receive the motion signal and to deliver an appropriate push or pull action to that element of the transmission system which shifts the transmission speeds.

Another part of the subject invention is a hydraulic damping system connected to the force sensing element so that shock loads and shock type force changes may be applied to the system, but an effective motion signal will result only if the change in force is sustained over some extended period of time. For instance, the damping system may include a movable piston surrounded by a hydraulic fluid inside a sealed cylinder. Sudden force applied to the piston via a piston rod will cause a higher pressure on one side of the piston, but the rate at which the fluid can flow from the high pressure side to the low pressure side will control the rate of the motion signal. The rate at which the fluid will flow depends principally on fluid viscosity, pressure differential, and the nature of the fluid flow path. This path may be around the circumference of the piston, or through an orifice, or both. It will be obvious to those skilled in the art that other style hydraulic damping systems, such as a diaphragm, may be substituted for the cylinder described. An external orifice also may be provided to permit adjustment of the response rate. The response rate should be slow enough that the variations in pedal force which are associated with pedal position do not cause a speed shift, but not so slow that the rider's energy is exhausted before appropriate speed shifts are made in response to changed conditions. Inasmuch as normal pedal speeds are around 60 revolutions per minute, but they may be under 30 revolutions per minute, or under 60 force thrusts per minute, the response time to shift between speeds should be longer than one second.

The force sensing element may be associated with the chain drive as described in prior art (U.S. Pat. No. 3,613,466) or it may also be associated with the seat of the vehicle, usually called a saddle for bicycles. Such associations are illustrated in FIGS. 3 and 4.

Figure 4:
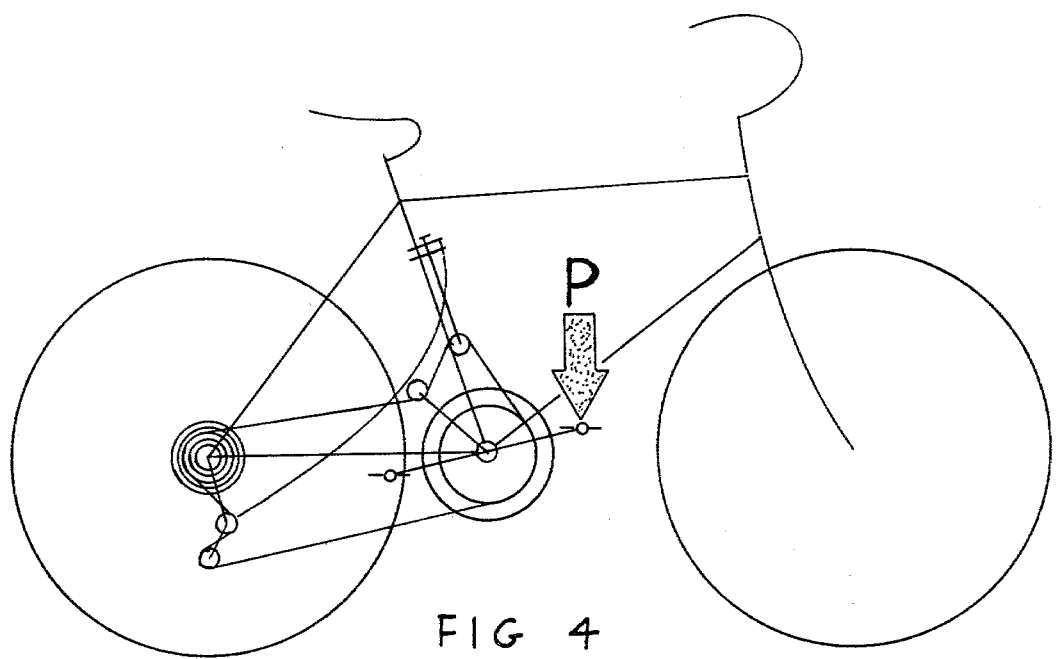
FIG. 4 illustrates a force sensing mechanism responsive to pedal pressure.

As shown in FIG. 3, a bicycle rider can distribute his weight so portion S rests on the saddle, portion H is carried by the handlebars, and portion P is pressed on the pedals. Normally H is small compared to S and P. Portion S may vary essentially from W at rest, or when coasting, to zero when the rider is standing on the pedals for maximum force, or when the rider is off the bicycle. Conversely, the weight on the pedals can vary from zero at rest, or when coasting, to somewhat more than W if the rider tugs upward on the handlebars. Under shock conditions P or S can exceed W due to inertial loading.

FIGS. 1 and 2 specifically illustrate a force sensing element intended to function under a bicycle saddle, as illustrated in FIG. 3. The tubular post (5) is of the same outside diameter as the tubular post commonly used to support a bicycle saddle. Another tube (3) can slide in a telescoping fashion within tube (5), and the saddle (not shown) is attached by a suitable support (2) to (3). When sufficient weight is carried by the saddle, tube (3) moves downward against the resistance of the spring (11) until equilibrium is established. However, the rate at which the saddle, tube (3) and piston (10) can travel relative to post (5) is limited by the rate at which hydraulic fluid (9) above and below the piston (10) can flow from the high pressure side of the piston to the low pressure side. Hydraulic fluid, (9) is contained within a cylindrical space having a bottom (12) and a top (7) and a suitable seal (8). An adjustment knob (1) can be turned relative to tube (3) and the saddle, so that the threaded portion causes the piston rod (6) and piston (10) to move either up or down as desired by the rider. Splines (4) on the piston rod are to prevent rotation of the piston when the adjustment knob (1) is turned. Not shown are means to prevent tube (3) from turning within tube (5); these would prevent the saddle from turning relative the bicycle.

FIG. 2 shows an external view of a force sensing element, and part of a push-pull cable assembly, 16 and 17, which is part of a motion linkage system. Connection element 13 is fixed relative to tube 3 and the saddle. Connection element 14 is fixed relative to tube 5 and the frame of the bicycle. When sufficient weight is on the saddle to overcome the resistance of the spring 11 shown in FIG. 1, and this weight force is sustained long enough to overcome the damping effect of the hydraulic fluid, element 13 moves at a restrained rate toward element 14. This relative motion, herein called a motion signal, causes a push action on cable 16. Such a push action may be sufficient to shift the speed ratio in the adjustable speed force transmission system.

As previously noted, the automatic shift control can be adapted to work with any of several variable speed transmissions, but it is important that the transmission element which shifts on the command of a push or pull action is not left in some intermediate position so that very small push or pull actions result in a succession of speed changes.

Variable speed transmissions having detent positioners are known, (U.S. Pat. Nos. 3,974,707 and 4,037,484) and commercially available. For instance, the Shimamo Company now markets a derailleur mechanism (Shimamo FF) with a detent system and manually controlled shift levers that can be moved full scale, low to high or vice-versa, when the bicycle is stopped. A mechanism of this type is very easily adapted to automatic shift control.

The general problem of avoiding an excessive number of shifts can be dealt with partly by adjusting the rate at which hydraulic pressures are equalized, i.e. the clearance around the piston or the size of the orifice, and in addition, by intentionally providing for some "play" in the mechanical linkage between the force sensing device and the element that receives the push-pull command. This desensitization can be achieved using slotted or loose-fitting mechanical connections as shown in FIG. 2. For instance, when the distance between speed settings or detent positions is about ¼-inch, say 0.24-inches, and this also corresponds to a six pound difference in pedal force, a slotted mechanical connection giving 0.16-inches of play would permit a detented position to be unstrained while the force sensing element moves within a four pound range. It is obvious that a longer slot will further reduce the sensitivity of the automatic gear shifter so that fewer cyclic commands for shifting will be received by the transmission.

In FIG. 2 there are illustrated three unused alternative sets of slots for connecting the push-pull cable assembly to elements 13 and 14. Slot 15 has exaggerated length for illustrative purposes. A shorter slot or set of slots is beneficial.

A healthy adult bicycle rider reportedly can maintain a power output of about 0.4 horsepower for about one hour, and the rider reportedly is most efficient at about 60 pedal revolutions per minute. Beyond that an output of 0.25 HP or less is expected. The corresponding pedal forces for a 60 RPM seven-inch crank are 94 lbs at 0.4 horsepower, and 59 lb at 0.25 horsepower. A typical recreational rider normally expects to exert less effort than this.

Such a rider may wish to coast or to cruise in high gear with a pedal force between zero and say 20 lb, and he may wish to be in low gear when P is 38 lb or more. For a bicycle having five gears on the rear wheel, like a typical derailleur set ranging from 14 to 28 teeth, a spring may be chosen so that a change of six pounds in P is sufficient to shift gears. The same rider may choose to ride with much less exertion, or to shift into low gear when P exceeds say 26 lbs. Alternatively, if a faster ride is desired with the expenditure of more energy, the pre-load on the spring can be readjusted so that high gear is maintained say P up to 36 lbs, and low gear is used when P is 54 lb or more.

When the load sensing element is associated with the saddle support, it is necessary to compensate both for the weight of rider and the portion of the weight that is on the handlebars, H. For the cases cited above, loads can be tabulated and compared as follows:

| GEAR | CASE INTER-MIDATE SETTING | EASY RIDING | FAST RIDING | |
|---|---|---|---|---|
| low | 38–up | 26–up | 54–up | |
| 2 | 32–38 | 20–26 | 48–54 | desired |
| 3 | 26–32 | 14–20 | 42–48 | pedal |
| 4 | 20–26 | 8–14 | 36–42 | force |
| Hi | 0–20 | 0–8 | 0–36 | |
| low | 62–0 | 74–0 | 46–0 | corresponding |
| 2 | 68–62 | 80–74 | 52–46 | saddle force |
| 3 | 74–68 | 86–80 | 58–52 | for 110 lb |
| 4 | 80–74 | 92–86 | 64–58 | person with 10 lb |
| Hi | 100–80 | 100–92 | 100–64 | on handlebars |
| low | 52–0 | 64–0 | 36–0 | corresponding |
| 2 | 58–52 | 70–64 | 42–36 | saddle force |
| 3 | 64–58 | 76–70 | 48–42 | for 110 lb |
| 4 | 70–64 | 82–76 | 54–48 | person with 20 lb |
| Hi | 90–70 | 90–82 | 90–54 | on handlebars |
| low | 22–0 | 34–0 | 6–0 | corresponding |
| 2 | 28–22 | 40–34 | 12–6 | saddle force |
| 3 | 34–28 | 46–40 | 18–12 | for 67 lb person |
| 4 | 40–34 | 52–46 | 24–18 | with 7 lb on |
| Hi | 60–40 | 60–52 | 60–24 | handlebar |

The above tabulation illustrates the need to provide adjustment for the amount of weight that is to be carried by the seat (or saddle) in any selected transmission speed. FIG. 1 illustrates how spring 11 can be pre-loaded to various values by turning adjustment knob 1 and screwing the piston 10 down against the spring. When the bicycle is not in use the spring will push piston 10, tube 3, element 13, and the seat to the top of the limited travel, and the speed transmission will be in low gear. With a small pre-load it may take only a six or eight force on the seat to up-shift to second gear, or with a larger preload, over 71 pounds on the seat may be needed to upshift from low to second.

It will be obvious that when the load sensing device is associated with the saddle and adjustments are made with adjustment knob (1) to apply an additional pre-load on the spring, 11, pedaling will become easier and the rider will travel less distance in a given time. However, the rider also can lean forward and support more weight on the handlebars to cause a down-shift for easier pedaling, or vise-versa, he can lean back to take some weight off the handlebars and cause a shift to a higher setting.

When the rider comes to a temporary stop, he has the option of taking all or most of his weight off the saddle to shift to low gear for easy starting, holding part of his weight on the seat for an intermediate gear, or applying all of his weight to the seat to shift into high gear.

It is also practical to select stiffer springs for heavier riders, so that the incremental loading between speed settings are greater, or it is possible to select softer springs to reduce the incremental loadings.

It is also possible to mount a load-responsive device over the pedal sprockets as in FIG. 4 to sense the chain load directly. A much stiffer spring is needed in this case, because the extended lever arm to the pedal provides a greater chain tension than pedal force, and moreover, the single pulley arrangement as illustrated essentially doubles the chain load. This arrangement requires additional cost and chain quarding, but it does not require as much compensation for variations in a rider's weight. It is obvious that anyone skilled in this art could mount a unit such as is illustrated in FIG. 1 so that additional tension on this bicycle drive chain tends to compress the unit and produce a motion signal.

The examples, numbers, and Figures in the foregoing were chosen to give an understanding of the invention, and it should be understood that actual values and designs may be different within the scope of the invention.

What is claimed is:

1. An automatic force-responsive shift control for a vehicle having:
   a. At least one power driven wheel;
   b. Pedals to receive input force provided by the rider;
   c. An adjustable speed force transmission system, to transmit force from the pedals to a wheel, wherein the transmission speed represents a ratio of wheel speed to pedal speed, and the speed ratio can be shifted by a push or pull action;
   d. A force sensing element having means to produce a motion signal in response to a force change;
   e. A motion linkage system, with means to receive the said motion signal and to deliver a push or pull action to the force transmission system;
wherein the said force sensing element is restrained by a hydraulic damping system having means to prevent undesirable fast speed shifting due to shock loads, and means to prevent cyclic shifting due to the normal cyclic applications of force to the pedals.

2. An automatic force-responsive shift control as in claim 1, wherein the said motion linkage system includes a slotted mechanical connection which has the means to receive motion signals within a selected range without delivering a corresponding push or pull action to the force transmission system.

3. An automatic force-responsive shift control as in claim 1, wherein the hydraulic damping system has means to permit adjustment of the response rate.

4. An atomatic force-responsive shift control for a vehicle having:
   a. At least one power driven wheel.
   b. Pedals to receive input force provided by the rider.
   c. An adjustable speed force transmission system, to transmit force from the pedals to a wheel, wherein the transmission speed represents a ratio of wheel speed to pedal speed, and the speed ratio can be shifted by a push or pull action.
   d. A force sensing element having means to produce a motion signal in response to a force change.
   e. A motion linkage system, with means to receive the said motion signal and to deliver a push or pull action to the force transmission system.
   f. A seat (or saddle) and a seat support.
wherein the said force sensing element is restrained by a hydraulic damping system having means to prevent undesirable fast speed shifting due to shock loads, and means to prevent cyclic shifting due to the normal cyclic application of force to the pedals, and the said force sensing element is connected to the seat, with means to sense changes in that portion of the rider's weight which is supported by the seat.

5. An automatic force-responsive shift control as in claim 4, wherein the said motion linkage system includes a slotted mechanical connection which has the means to receive motion signals within a selected range without delivering a corresponding push or pull action to the force transmission system.

6. An automatic force-responsive shift control as in claim 4, wherein the force sensing element includes means to adjust the amount of the rider's weight which can be carried by the seat in a selected transmission speed.

7. An automatic force-responsive shift control for a vehicle having:
   a. At least one power driven wheel.
   b. Pedals to receive input force provided by the rider.
   c. An adjustable speed force transmission system, to transmit force from the pedals to a wheel, wherein the transmission speed represents a ratio of wheel speed to pedal speed, and the speed ratio can be shifted by a push or pull action.
   d. A force sensing element having means to produce a motion signal in response to a force change.
   e. A motion linkage system, with means to receive the said motion signal and to deliver a push or pull action to the force transmission system.
   f. A chain or belt as part of the force transmission system.
wherein the said force sensing element is restrained by a hydraulic damping system having means to prevent undesirable fast speed shifting due to shock loads, and means to prevent cyclic shifting due to the normal cyclic application of force to the pedals, and the said force sensing element is connected to the chain or belt and is so arranged that sufficient changes in chain or belt tension, if sustained long enough, will give a motion signal sufficient to shift the speed ratio of the force transmission system.

8. An automatic force-responsive shift control as in claim 7, wherein the said motion linkage system includes a slotted mechanical connection which has the means to receive motion signals within a selected range without delivering a corresponding push or pull action to the force transmission system.

9. An automatic force-responsive shift control as in claim 7, wherein the force sensing element includes means to adjust the amount of force which can be applied to a pedal in a selected transmission speed.

* * * * *